US012745088B2

(12) United States Patent
Sun et al.

(10) Patent No.: US 12,745,088 B2
(45) Date of Patent: Sep. 22, 2026

(54) ENHANCING RECONFIGURABLE INTELLIGENT SURFACE SECURITY WITH ANGLE OF ARRIVAL AND ANGLE OF DEPARTURE BASED FULL PATH INTEGRITY VALIDATION

(71) Applicant: Dell Products L.P., Round Rock, TX (US)

(72) Inventors: Sheng Sun, Kanata (CA); Tejinder Singh, Manotick (CA); Raja Neogi, Portland, OR (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/656,396

(22) Filed: May 6, 2024

(65) Prior Publication Data

US 2025/0344066 A1 Nov. 6, 2025

(51) Int. Cl.
*H04W 12/121* (2021.01)
*H04B 7/04* (2017.01)
*G01S 3/48* (2006.01)

(52) U.S. Cl.
CPC ...... *H04W 12/121* (2021.01); *H04B 7/04013* (2023.05); *G01S 3/48* (2013.01)

(58) Field of Classification Search
CPC ..... H04W 12/121; H04B 7/04013; G01S 3/48
USPC ........................................................... 726/23
See application file for complete search history.

(56) References Cited

U.S. PATENT DOCUMENTS

| | | | | |
|---|---|---|---|---|
| 12,413,932 | B2 | 9/2025 | Gummadi et al. | |
| 2011/0080302 | A1* | 4/2011 | Muthaiah | H04L 69/321 340/903 |
| 2014/0225804 | A1* | 8/2014 | Wild | G06K 7/10356 343/876 |
| 2015/0138992 | A1 | 5/2015 | Jover | |
| 2021/0036753 | A1 | 2/2021 | Lee et al. | |
| 2021/0103058 | A1* | 4/2021 | Dries | H04L 41/06 |

(Continued)

OTHER PUBLICATIONS

Office Action mailed Aug. 27, 2025 for U.S. Appl. No. 18/656,449, 57 pages.

(Continued)

*Primary Examiner* — Meng Vang
(74) *Attorney, Agent, or Firm* — Amin, Turocy & Watson, LLP

(57) ABSTRACT

The technology described herein is directed towards monitoring path integrity of a wireless communications path between authorized entities, in which a reconfigurable intelligent surface is part of the signal path between a base station and a user equipment. In one example, an eavesdropping entity intercepts signals to and/or from a base station and user equipment via a reconfigurable intelligent surface, and redirects the intercepted signals to the intended receivers to continue communications. The change in the path from the redirected signals can be detected, e.g., via actual angle of arrival data that does not match expected angle of arrival data. The reconfigurable intelligent surface includes a delay detection network that detects impedance changes corresponding to differential phase changes among unit cells of the reconfigurable intelligent surface, which relates to the actual angle of arrival. In one implementation, generative adversarial network models are used in the monitoring of the signal path.

20 Claims, 14 Drawing Sheets

(56) References Cited

U.S. PATENT DOCUMENTS

| | | | | |
|---|---|---|---|---|
| 2021/0109184 | A1* | 4/2021 | Baker | G01S 3/48 |
| 2022/0390541 | A1* | 12/2022 | Chen | G01S 5/04 |
| 2023/0099551 | A1* | 3/2023 | Gupta | H04W 64/003<br>701/36 |
| 2023/0188170 | A1 | 6/2023 | Dutta et al. | |
| 2024/0046026 | A1 | 2/2024 | Lempel et al. | |
| 2024/0104202 | A1* | 3/2024 | Duan | H04W 4/029 |

OTHER PUBLICATIONS

Singh et al. "Full Path Integrity Correction in a Reconfigurable Intelligent Surface Based on Compromised Path Detection" U.S. Appl. No. 18/656,449, filed May 6, 2024, 67 pages.

Sun et al. "Enhancing Reconfigurable Intelligent Surface Security With Time of Flight Based Full Path Integrity Validation" U.S. Appl. No. 18/656,412, filed May 6, 2024, 45 pages.

Notice of Allowance received for U.S. Appl. No. 18/656,449 dated Dec. 3, 2025, 10 pages.

* cited by examiner

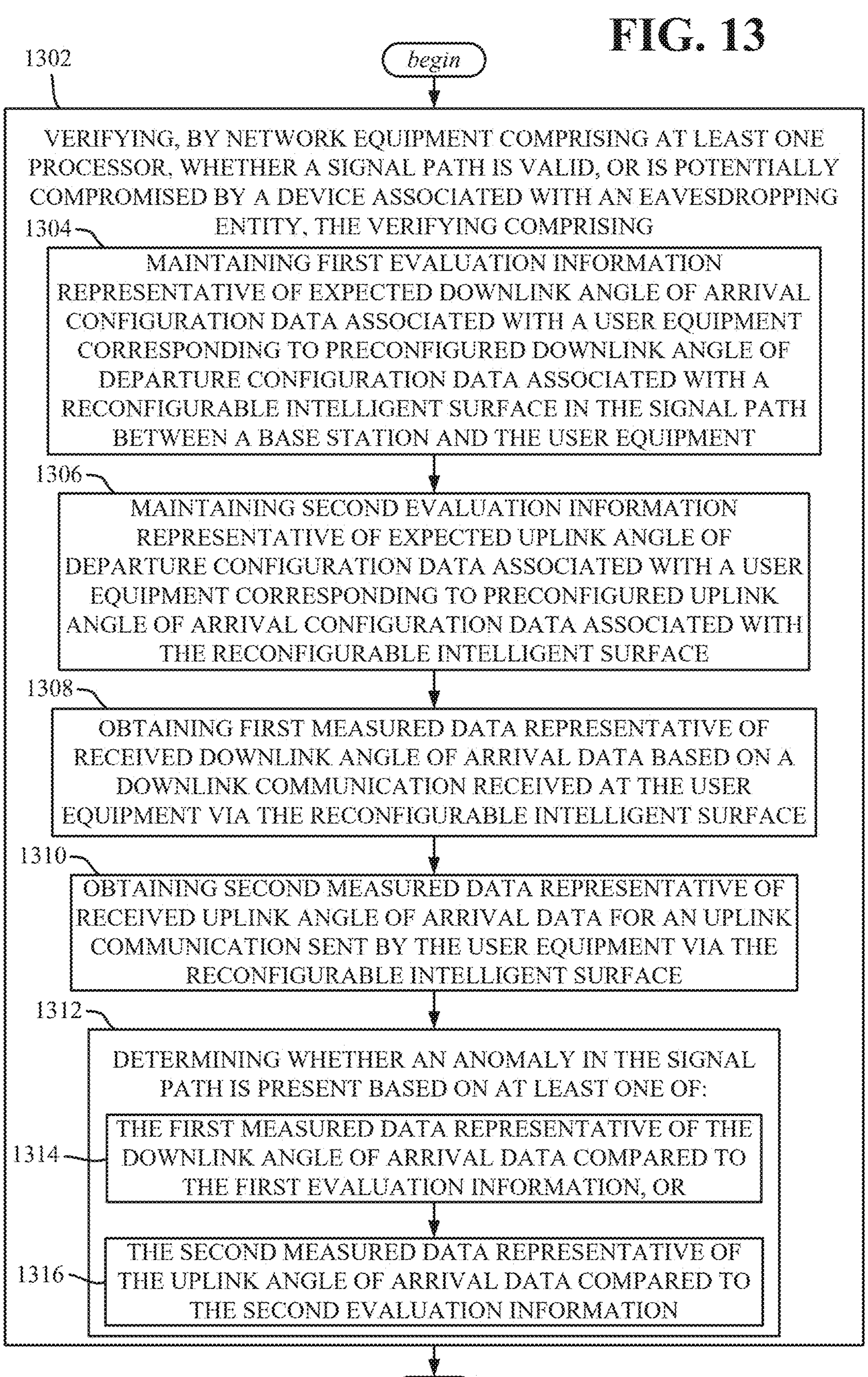
FIG. 13
begin
1302
VERIFYING, BY NETWORK EQUIPMENT COMPRISING AT LEAST ONE PROCESSOR, WHETHER A SIGNAL PATH IS VALID, OR IS POTENTIALLY COMPROMISED BY A DEVICE ASSOCIATED WITH AN EAVESDROPPING ENTITY, THE VERIFYING COMPRISING
1304
MAINTAINING FIRST EVALUATION INFORMATION REPRESENTATIVE OF EXPECTED DOWNLINK ANGLE OF ARRIVAL CONFIGURATION DATA ASSOCIATED WITH A USER EQUIPMENT CORRESPONDING TO PRECONFIGURED DOWNLINK ANGLE OF DEPARTURE CONFIGURATION DATA ASSOCIATED WITH A RECONFIGURABLE INTELLIGENT SURFACE IN THE SIGNAL PATH BETWEEN A BASE STATION AND THE USER EQUIPMENT
1306
MAINTAINING SECOND EVALUATION INFORMATION REPRESENTATIVE OF EXPECTED UPLINK ANGLE OF DEPARTURE CONFIGURATION DATA ASSOCIATED WITH A USER EQUIPMENT CORRESPONDING TO PRECONFIGURED UPLINK ANGLE OF ARRIVAL CONFIGURATION DATA ASSOCIATED WITH THE RECONFIGURABLE INTELLIGENT SURFACE
1308
OBTAINING FIRST MEASURED DATA REPRESENTATIVE OF RECEIVED DOWNLINK ANGLE OF ARRIVAL DATA BASED ON A DOWNLINK COMMUNICATION RECEIVED AT THE USER EQUIPMENT VIA THE RECONFIGURABLE INTELLIGENT SURFACE
1310
OBTAINING SECOND MEASURED DATA REPRESENTATIVE OF RECEIVED UPLINK ANGLE OF ARRIVAL DATA FOR AN UPLINK COMMUNICATION SENT BY THE USER EQUIPMENT VIA THE RECONFIGURABLE INTELLIGENT SURFACE
1312
DETERMINING WHETHER AN ANOMALY IN THE SIGNAL PATH IS PRESENT BASED ON AT LEAST ONE OF:
1314
THE FIRST MEASURED DATA REPRESENTATIVE OF THE DOWNLINK ANGLE OF ARRIVAL DATA COMPARED TO THE FIRST EVALUATION INFORMATION, OR
1316
THE SECOND MEASURED DATA REPRESENTATIVE OF THE UPLINK ANGLE OF ARRIVAL DATA COMPARED TO THE SECOND EVALUATION INFORMATION
end

ENHANCING RECONFIGURABLE INTELLIGENT SURFACE SECURITY WITH ANGLE OF ARRIVAL AND ANGLE OF DEPARTURE BASED FULL PATH INTEGRITY VALIDATION

BACKGROUND

Reconfigurable intelligent surfaces (alternatively referred to as intelligent reflective surfaces, or metasurfaces) are man-made thin reflective or refractive surfaces whose electromagnetic response can be electronically controlled. Reconfigurable intelligent surfaces are characterized by their two-dimensional arrays of electronically controllable reflecting elements that can dynamically manipulate electromagnetic waves by altering attributes such as phase, amplitude, and direction of the incoming signal.

Each metasurface typically is made up of (possibly up to) dozens, hundreds or thousands of unit-cells, and because the individual unit-cell can be controlled, reconfigurable intelligent surfaces can provide programmable and smart wireless environments. For example, one scenario is to use such a surface to intelligently reconfigure wireless communications. More particularly, objects in the path of a wireless signal, such as buildings and trees, can block wireless communication signals at higher frequencies, including millimeter-wave (mm-Wave) frequency bands (24.5 gigahertz, or GHz-52.6 GHZ), and even higher. This can be overcome by installing a large number of base stations to provide coverage to otherwise blocked areas, but doing so would increase the infrastructure costs many times. Instead, a relatively inexpensive metasurface can be installed at various locations to reflect and/or refract higher frequency signals to otherwise blocked or weak coverage areas.

Physical security can be compromised in a mm-Wave communication system with reconfigurable intelligent surfaces. For example, an eavesdropper can introduce another reflector or metasurface that facilitates unauthorized receiving of the downlink beam to and/or uplink beam from a legitimate user equipment.

BRIEF DESCRIPTION OF THE DRAWINGS

The technology described herein is illustrated by way of example and not limited in the accompanying figures in which like reference numerals indicate similar elements and in which:

FIG. 13 is a flow diagram showing example operations related to verifying whether a signal path is valid or is potentially compromised by a device associated with an eavesdropping entity, in accordance with various example embodiments and implementations of the subject disclosure.

DETAILED DESCRIPTION

Figure 1:
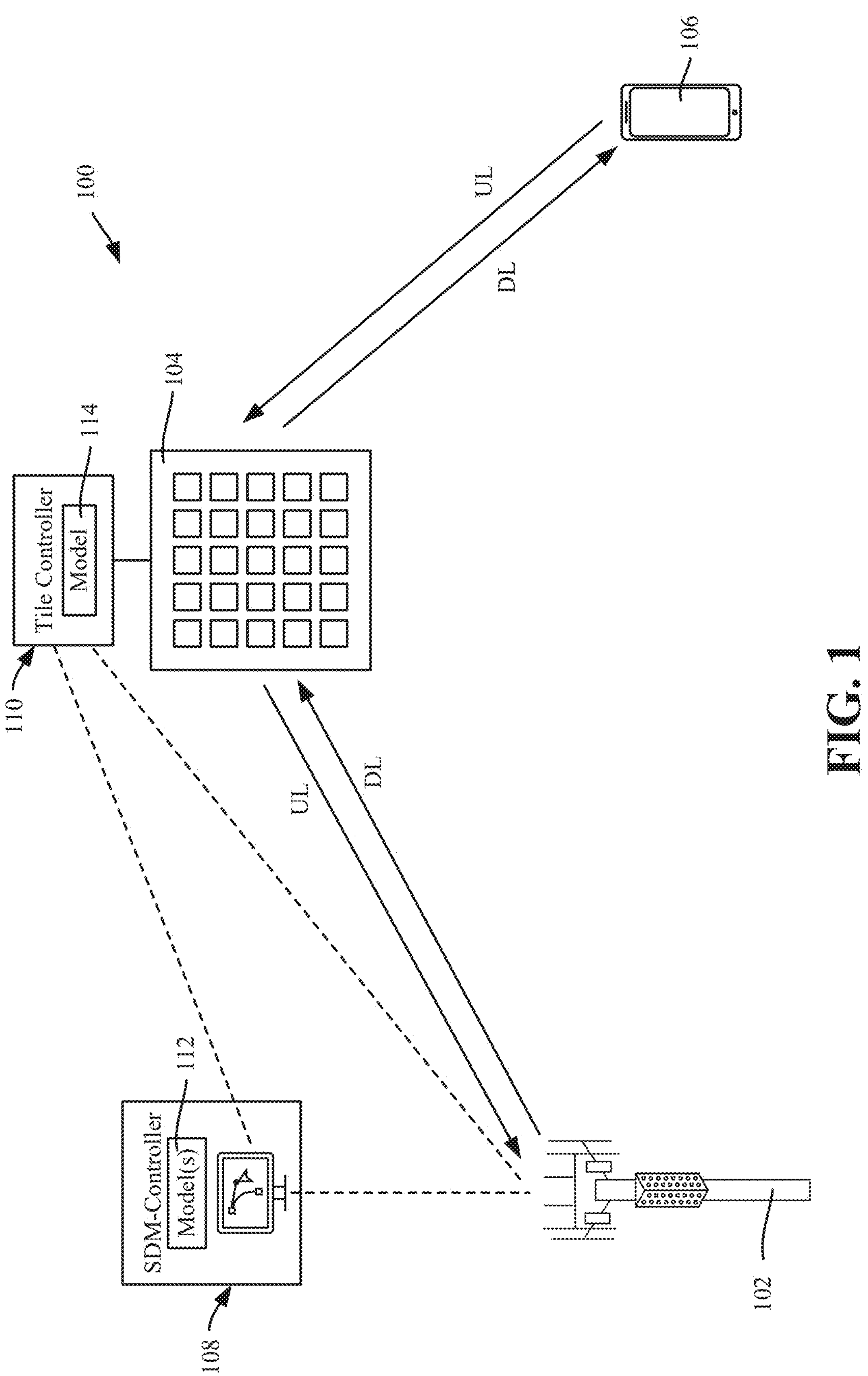
FIG. 1 is a representation of an example secure communication setup using a reconfigurable intelligent surface in a communications path, including models for verifying path integrity, in accordance with various example embodiments and implementations of the subject disclosure.

The technology described herein is generally directed towards verifying the integrity of a wireless communications path that includes a reconfigurable intelligent surface (also referred to as a tile), based on identifying any anomalies with respect to expected data. For example, an anomaly in the expected versus actual angle-or-arrival (AoA) for a given angle-of-departure (AoD) at the base station can be detected. This type of fingerprinting is facilitated by adding path-sensitive delay detection hardware (e.g., including multiple metal-insulator-metal capacitors) to a reconfigurable intelligent surface's hardware, as the detected delay relates to the actual angle of arrival.

In one implementation, a receiving antenna is incorporated into or coupled to the reconfigurable intelligent surface, along with a delay detection network that monitors a signal for potential existence of the additional delay. An additional, unexpected delay can indicate a "change of path" attack in which an eavesdropping entity intercepts the source (e.g., base station-originated or user equipment-originated signal) and thereafter redirects the source signal to the intended receiver. By monitoring for such additional delay in the path, a notification of a potentially compromised signal path can be output (e.g., to the base station) for taking some mitigating action. The downlink angle of departure from the base station, via the reconfigurable intelligent surface, and the downlink angle of arrival at the user equipment can be parameters for part of the bidirectional path integrity evaluation. Similarly, the uplink angle of departure from the user equipment, and the uplink angle of arrival base station via the reconfigurable intelligent surface, can be bidirectional path integrity evaluation parameters.

In one implementation, artificial intelligence/machine learning models can be used for automatic anomaly detection, e.g., by determining and evaluating the relative strengths of possible anomalies, e.g., for random samples in the path. Generative adversarial networks can be employed by an endpoint agent (e.g., at the user equipment) and at a tile controller coupled to the reconfigurable intelligent surface and the base station.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section.

Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a conceptual depiction of an example system 100 including a base station 102 that communicates downlink (DL) and uplink (UL) signal transmissions, via a reconfigurable intelligent surface 104, with a user equipment 106. Although not explicitly shown in FIG. 1, consider that the reconfigurable intelligent surface 104 is needed to avoid an obstacle between the base station 102 and the user equipment 106.

The base station 102 is coupled to a software defined metasurface (SDM) controller 108 that manages tile controllers, including a tile controller 110 coupled to the reconfigurable intelligent surface 104. Note that a tile controller may manage multiple reconfigurable intelligent surfaces, e.g., generally located close to one another, such as mounted on or deployed within a building or close group of buildings.

As will be understood, in one implementation, the defined metasurface controller 108 includes a group of artificial intelligence (AI/ML) models 112, and the tile controller 110 includes a model 114 (e.g., a generative adversarial network model), that work together to verify the integrity of the communications path between the base station 102 and the UE 106 via the reconfigurable intelligent surface 104. In one implementation, the group of AI/ML models 112 includes a deep reinforcement learning model, a large language model (LLM) and a generative adversarial network model.

Figure 2:
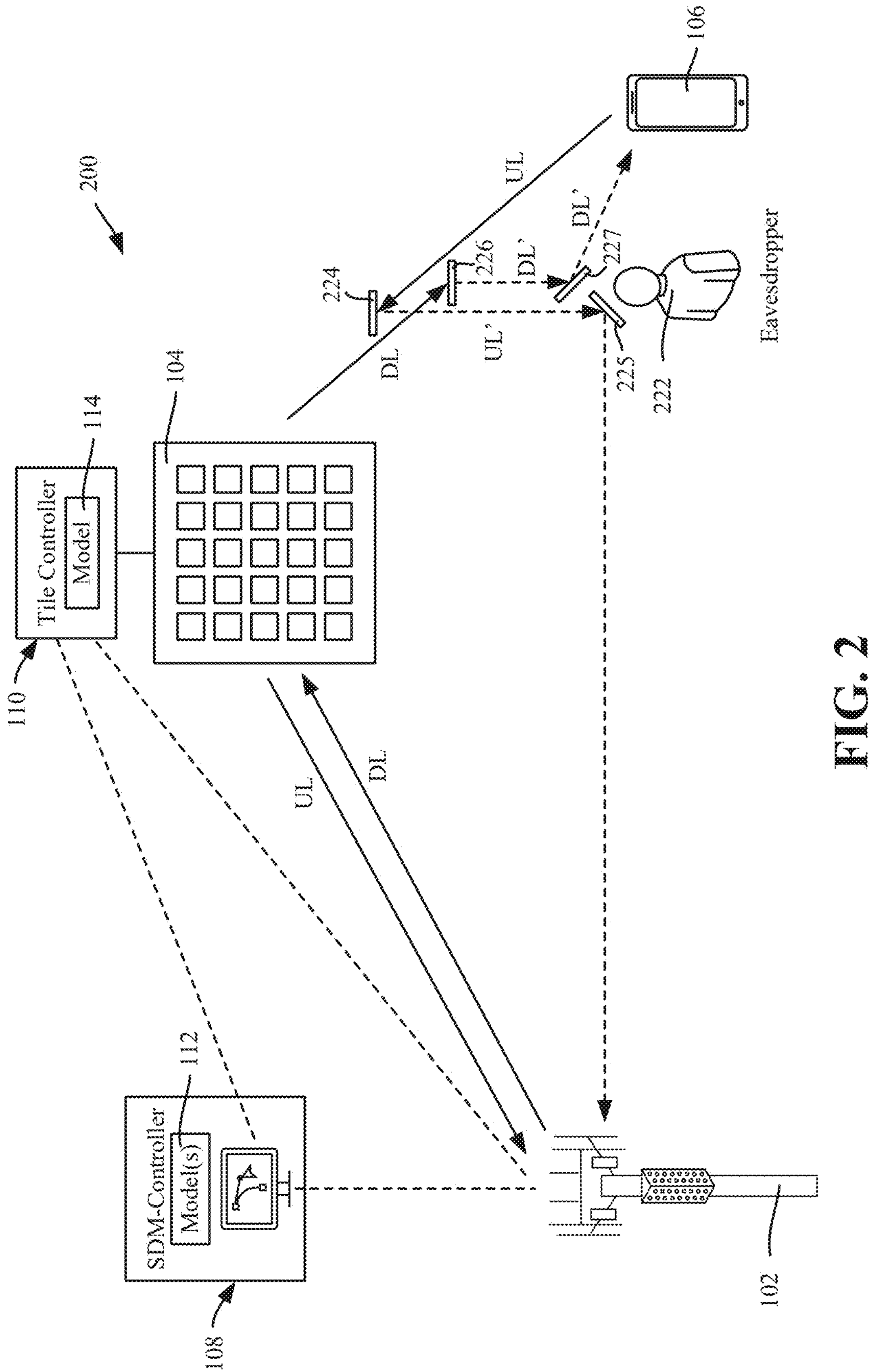
FIG. 2 is a representation of an example attacking scenario in which an eavesdropper intercepts and redirects uplink and/or downlink communications in a communications path involving a reconfigurable intelligent surface, in accordance with various example embodiments and implementations of the subject disclosure.

FIG. 2 is a conceptual depiction of a later instance 200 of the example system (i.e., system 100 of FIG. 1). In FIG. 2, an eavesdropping entity (eavesdropper) 222 has inserted one or more reflective elements (two example reflective elements 224 and 226 are shown) into the intended communications path to redirect the uplink UL and/or downlink DL communication signals as redirected signals UL' and DL'. Note that the eavesdropper 222 may hijack only the uplink or downlink signal, but in this example receives both.

In this attack scenario, so that the communications continue, the eavesdropper 222 also redirects the uplink signal (also denoted UL') from the user equipment 106 back to the base station 102 via a reflective element 225, and/or redirects the downlink signal (also denoted DL') to the user equipment 106 via a reflective element 227. Although not explicitly shown, consider that the eavesdropper 222 can avoid any obstacles when sending back the UL' and DL' signals, possibly via another reconfigurable intelligent surface or other reflecting element(s).

In this attacking scenario, when the eavesdropper changes the path of the uplink channel (UL) by introducing another reflector or metasurface, there is an additional delay added to the signal going from the user equipment to the base station, or from the base station to the user equipment, which also corresponds to a different uplink angle of arrival at the base station or downlink angle of arrival at the user equipment. The additional delay times are used to extract information about the authenticity of the signal; an advanced metasurface as described herein provides a layer of authentication to check the delayed signal at hardware level, offering a methodology of integrity validation over communication paths that use a reconfigurable intelligent surface for secure communication links.

Thus, described herein is detecting such an attack scenario, based on the base station not receiving the uplink communications via an expected uplink angle of arrival, and the user equipment not receiving the downlink communications via an expected downlink angle of arrival. To this end, the reconfigurable intelligent surface is coupled to a receive (Rx) antenna, (or multiple Rx antennas), and contains detection circuitry that detects changes from the expected path. In particular, the detection can be phase change detection, capacitance change detection, and/or differential delay detection; these are interrelated and map to an angle of arrival. For example, a received signal from one angle of arrival has different delay times experienced by the unit cells of the reconfigurable intelligent surface than when received from a different angle of arrival; these can be estimated through a change in resonance frequency of the overall capacitance, which also changes differential phase data, e.g., between adjacent unit cells.

In general, a reconfigurable intelligent surface is typically made from adaptable two-dimensional element arrays, also referred to as an array of unit cells, with each element/unit cell being able to toggle between multiple reflection phases. The precision of the reflected field patterns depends on the size of the aperture and the count of reflective elements, which can be suited to varying communication contexts and settings.

Figures 3A, 3B:
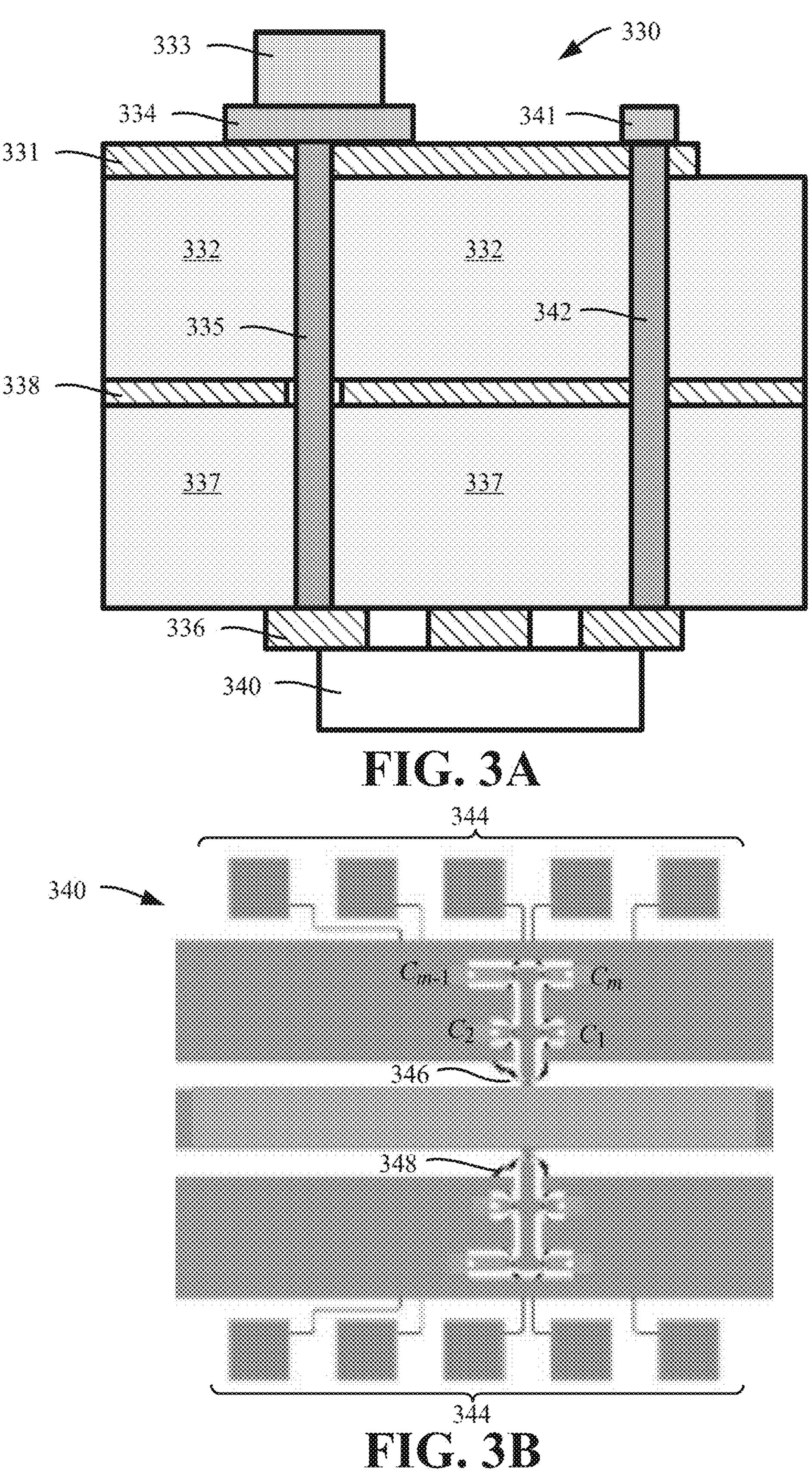
FIG. 3A is a cross-sectional side view of an example unit cell design showing a stack and arrangement of fabricated layers of a unit cell of a reconfigurable intelligent surface, in accordance with various example embodiments and implementations of the subject disclosure.
FIG. 3B is a representation of an example portion of a reconfigurable delay detection network that can be coupled to a reconfigurable intelligent surface's cells, by which communications path changes can be detected, in accordance with various example embodiments and implementations of the subject disclosure.

FIG. 3A shows a cross-sectional side view of a nonlimiting fabrication layer stack and arrangement of a unit cell 330. A top metallization layer 331 is patterned on a first substrate layer 332. The unit cells/elements are designed on each cell's metallization layer 330. In one example implementation, a surface mounted device (SMD) tunable device 333 (e.g., varactor/capacitor PIN diode) can be soldered on top of SMD pads 334 atop the metallization layer 331, with a via 335 (e.g., for voltage control connections of the tunable device 333) to a bottom metallization layer 336 (and control pads) that couples to a microcontroller that determines the voltage to the tunable device 333.

The underside of the first substrate layer 332 is separated from a second substrate layer 337 by a metal plane 338 acting as RF ground. Below the underside of the second substrate layer 337 is the bottom metallization layer 336 which is patterned to form the DC biasing and control circuitry. To ensure seamless interconnection across the multi-layered stack, the via 335 is strategically positioned. For instance, the tunable device 333 (e.g., varactor) is linked to two vias (only one via 335 is represented in the example of FIG. 3; another via, not explicitly shown, connects the varactor's negative terminal to the ground plane 338, while the other via 333 links its positive terminal to the biasing on the bottom metal layer 336.

Also shown in FIG. 3A is a delay detection network 340 as described herein, which in general operates to determine a delay value for the unit cell 330, which has a relationship with the angle of arrival of a signal. As described herein, the delay values for a group of unit cells can be mapped to differential phases, which can be used to estimate the angle of arrival.

The delay detection network 340 is coupled to the signal received at a receive (Rx) antenna 341 through a via 342. Note that not every unit cell needs a receive antenna. For example, there can be one receive antenna per subgroup of unit cells, e.g., a 9×9 subarray module. Still further, only unit cells (e.g., a row or column of adjacent unit cells) that are used for detecting the delay/capacitance change need to be coupled to a delay detection network, which in turn is coupled to a receive antenna.

FIG. 3B shows a portion of one nonlimiting example implementation of delay detection network circuitry 340. In FIG. 3B, control pads 344 couple the RF signal to capacitors, e.g., capacitors $C_1$-$C_m$, which facilitate reading the change in capacitance to investigate the delay of an RF signal received (via the Rx antenna 341) at the corresponding unit cell. Loading switches 346 and 348 can be controlled to change the total capacitance, e.g., by coupling different numbers and/or capacitors having different capacitance values together in various combinations.

Figure 4A:
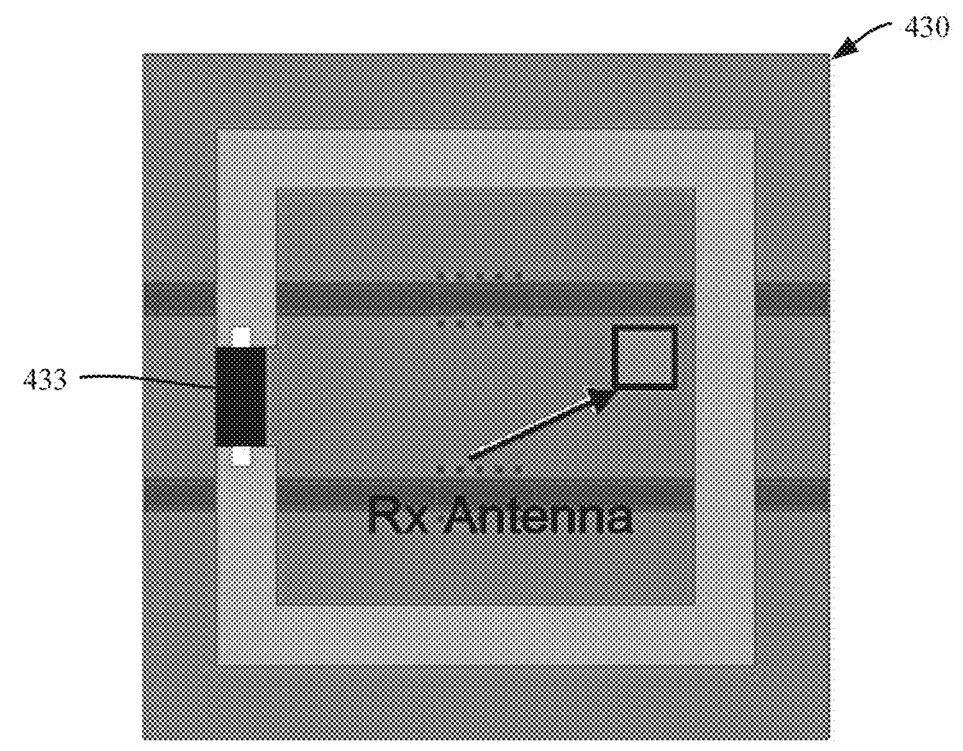
FIG. 4A is a semi-transparent top view representation of an example unit cell having a receive (Rx) antenna and a variable tuning element, in accordance with various example embodiments and implementations of the subject disclosure.
Figure 4B:
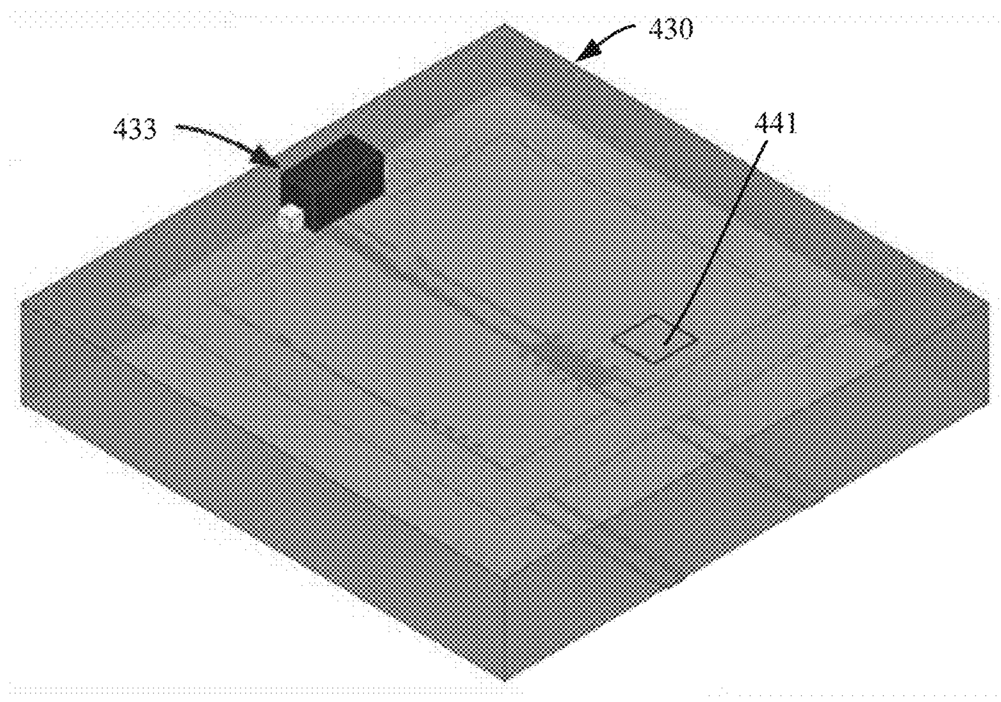
FIG. 4B is a semi-transparent perspective view representation of an example unit cell having a receive (Rx) antenna and a variable tuning element, in accordance with various example embodiments and implementations of the subject disclosure.

FIGS. 4A and 4B show a top view representation and a perspective view representation, respectively, of an example unit cell 403 having a receive (Rx) antenna 441 and a variable tuning element 433. As described with reference to FIG. 3A, the Rx antenna 441 is coupled to the delay detection network (FIG. 5), which can measure delay values corresponding to phases ($S_{21}$ signal)/capacitances/complex impedance which relate to the angle of arrival, which if different from what is expected (previously known to the base station/tile controller/centralized metasurface controller), can indicate that the signal path integrity is compromised.

Figure 5:
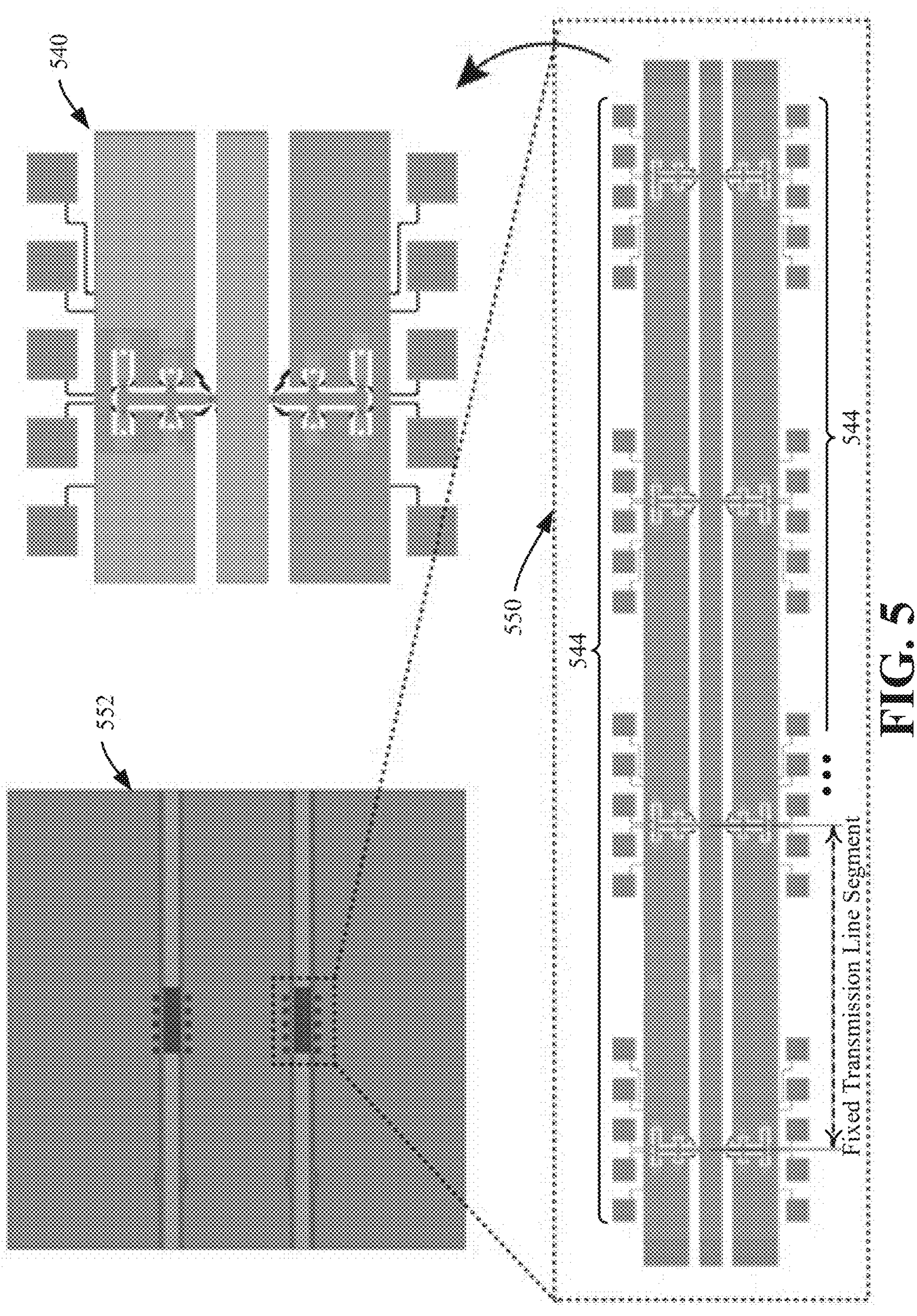
FIG. 5 is a representation of an example reconfigurable delay detection network, along with a bottom view representation of an example unit cell, and with an enlarged example portion of the delay detection network, in accordance with various example embodiments and implementations of the subject disclosure.

FIG. 5 is a representation of an example reconfigurable delay detection network 550, along with a bottom view representation 552 of an example unit cell and of an enlarged example portion of the reconfigurable delay detection network. Any signal that is flowing (e.g., from left to right) in the RF control pads 544, is used to detect any capacitance change (due to an impedance mismatch) that is occurring, that is, the capacitance/complex impedance is different on the well-known Smith chart for the $S_{21}$ signal, which corresponds to detecting differential phase values.

Figure 6:
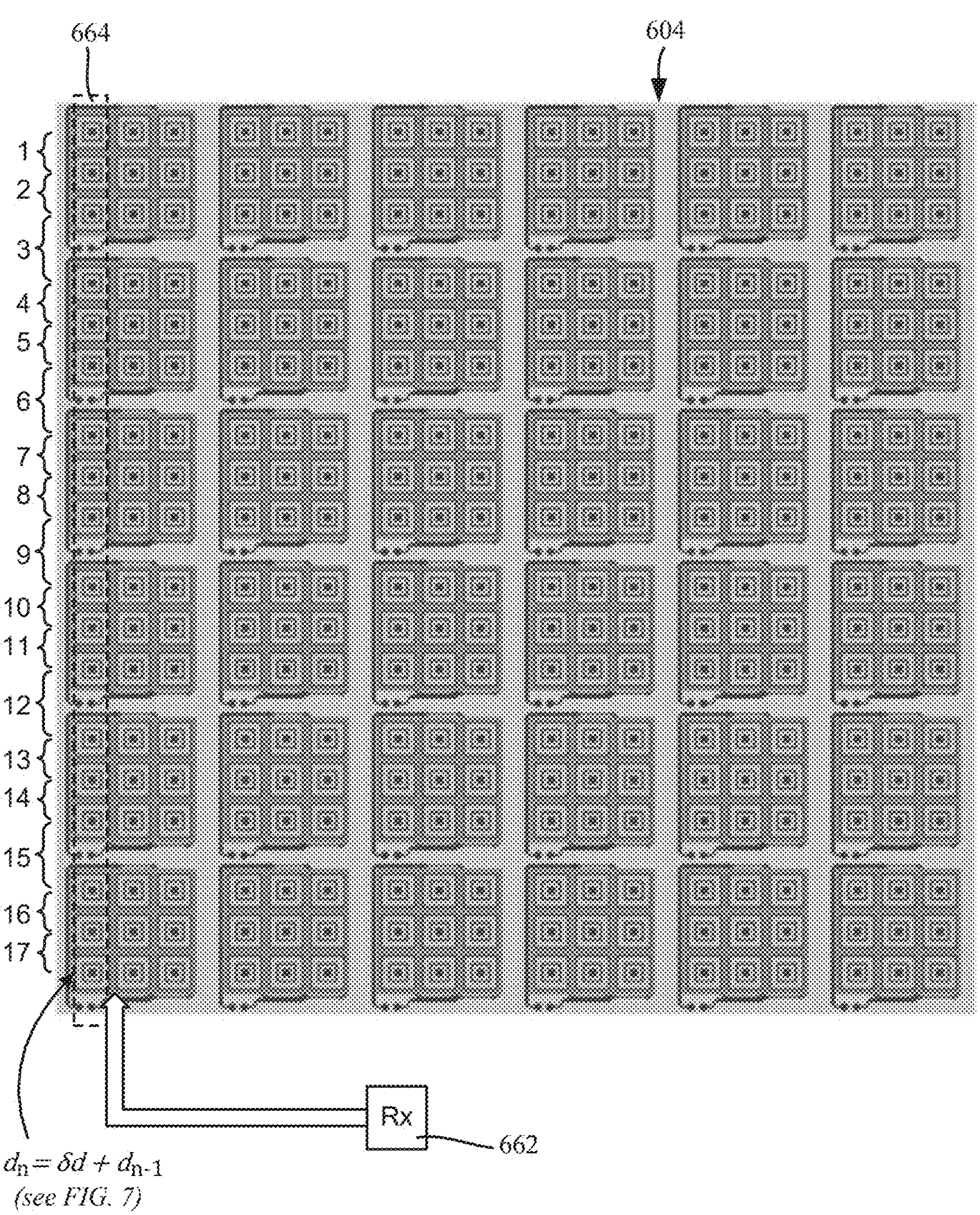
FIG. 6 is a reconfigurable intelligent surface of 6×6 panels using individual 3×3 modules of unit cells (total 18×18 unit-cell elements), coupled to a receive (Rx) antenna, and in which pairs of a selected column of adjacent unit cells experience different signal delays corresponding to an angle of arrival of a signal, in accordance with various example embodiments and implementations of the subject disclosure.

FIG. 6 shows a reconfigurable intelligent surface 604 in which the unit cells are arranged as 3×3 subarrays in modules, or subpanels in a 6×6 array, forming a total of 18×18 unit-cell elements. There is no requirement that unit cells be arranged as subarrays, or modules, however certain situations benefit from having such modules, e.g., a selected number of such modules can be interconnected as needed for a given scenario. As set forth herein, at least one receive Rx antenna 662 is associated with the reconfigurable intelligent surface 604 and coupled to corresponding delay detection network circuitry.

In one example implementation, these reconfigurable intelligent surfaces can be segmented into columns or rows of elements. Delay detection can occur within only one selected column or row, such as the leftmost column labeled 664 in FIG. 4.

Figure 7:
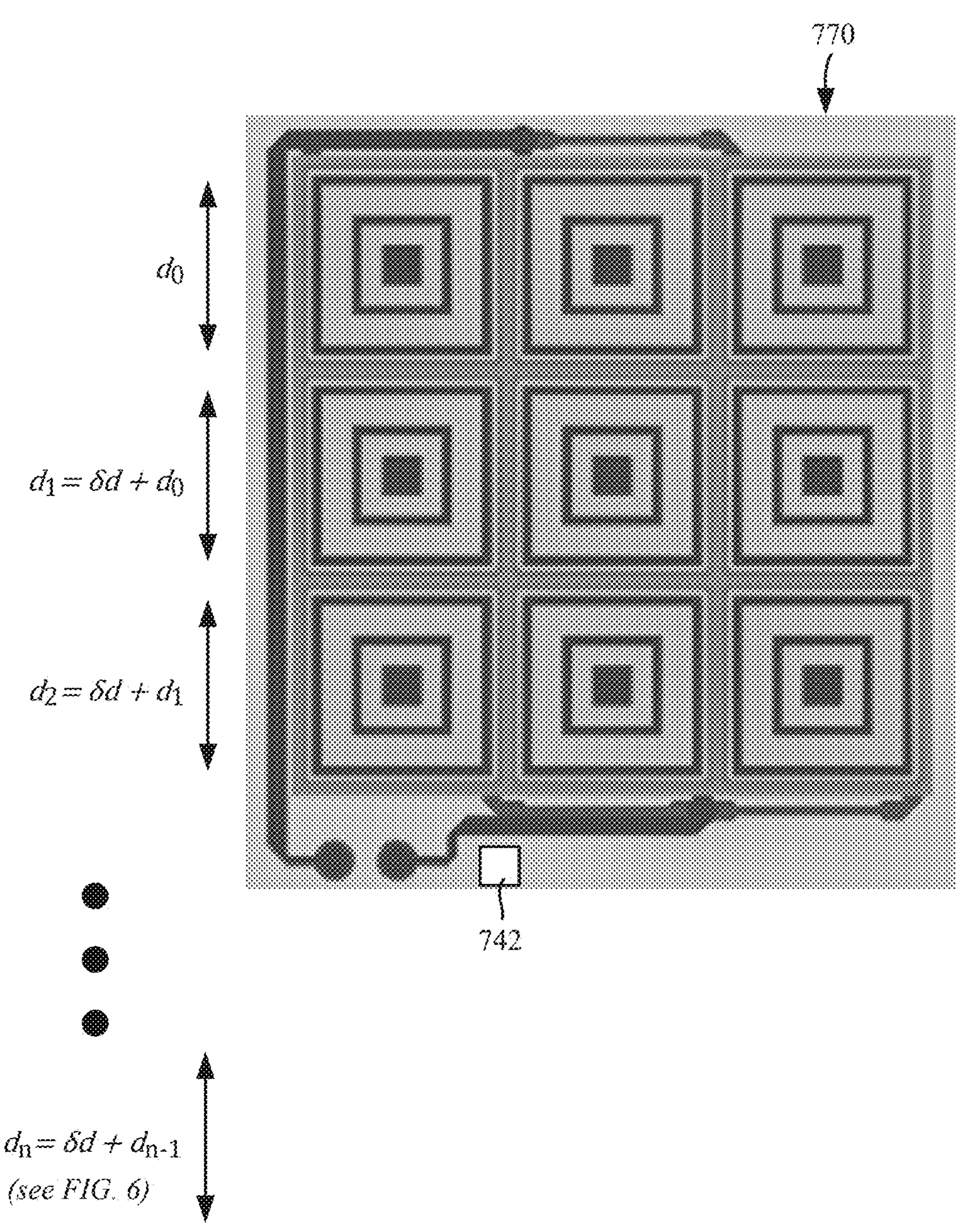
FIG. 7 is enlarged representation of an example 3×3 module of FIG. 6, incorporating a receive (Rx) antenna, showing different signal delays along vertically adjacent unit cells, in accordance with various example embodiments and implementations of the subject disclosure.

FIG. 7 shows the concept of delay detection, in which different delays are experienced at different cells of a subarray (module) 770 of the reconfigurable intelligent surface 604. A delay delta (δd) is added to each adjacent cell's delay in the same column, for example, and thus delay values range from $d_0$-$d_n$, increasing by dd for each adjacent cell downwards in this example. Note that a per-subarray receive antenna 742 is shown. Significantly, the differential delays correspond to the received signal's angle of arrival, which also corresponds to differential phases/capacitance values which determine the differential phases.

For example, for an uplink signal, the angle of arrival (AoA) is determined by using the differential delay between each element as shown in FIG. 7. The angle of departure (AoD) is controlled by the reconfigurable intelligent surface 604 (the tile controller coupled thereto). In other words, the differential delay between immediate/adjacent cells can be used to determine the angle of arrival.

To determine the differential delays, when the Rx antenna (s) at the reconfigurable intelligent surface receives the signal, the signal is processed through the bottom circuit layer where the reconfigurable delay detection network is connected. The reconfigurable delay detection network estimates the delay through a change in resonance frequency of the overall capacitance.

Thus, as described herein, among other information the received signal can be used to determine the angle of arrival of the incoming signal. This can be done by evaluating the phase differential values between at least some adjacent pairs of unit cells, represented in FIG. 6 by the column labels 1-17. For example, column (or row), the phase differential values between the fields sampled by the first and second substrate integrated waveguides is labeled as side-cell index '1', between the second and third substrate integrated waveguides of two adjacent unit cells is labeled as side-cell index '2', and so on.

Figure 8:
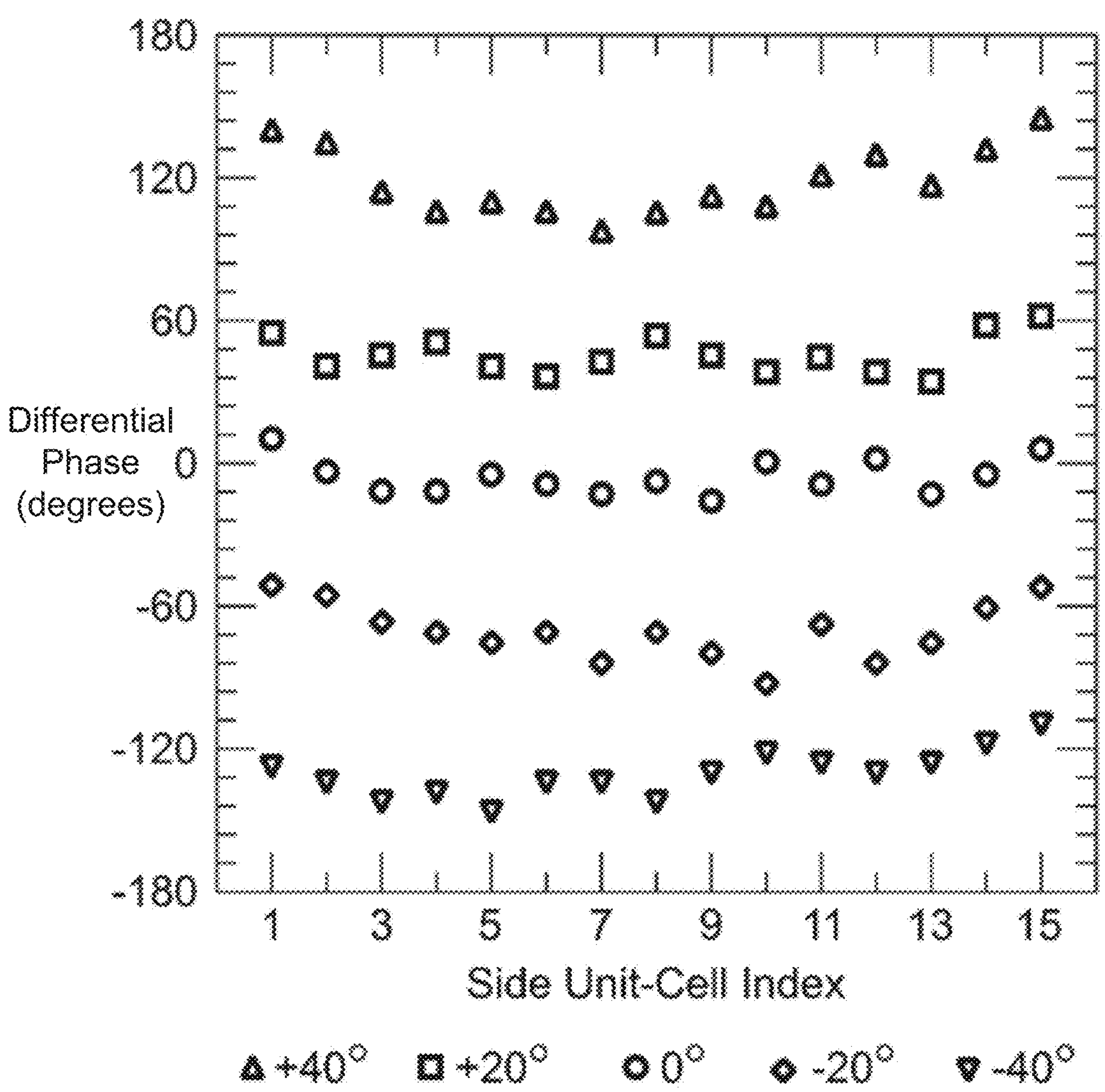
FIG. 8 is a graphical representation showing an example of differential phase values experienced by unit cells elements along a 16×1 array of elements of a reconfigurable intelligent surface, in accordance with various example embodiments and implementations of the subject disclosure.

FIG. 8 graphically shows the simulated differential phase along the reconfigurable intelligent surface array of 16×1 elements for the incoming wave at five different incident angles. More particularly, to illustrate how the technology described herein can deduce information about a reconfigurable intelligent surface's incoming signal/channel, a row of sixteen elements was selected resulting in fifteen adjacent cell pairs/side-cell indexes; (note that FIG. 6 depicts a selected column of eighteen elements having seventeen labeled pairs of side-cell indexes, however the principle is the same).

To obtain the results shown in FIG. 8, the phase differences were obtained between pairs of consecutive elements for incoming waves at different angles. For instance, as with FIG. 6, the measurement labeled '2' in FIG. 8 indicates the phase disparity between the second and third unit cells in the selected column. As can be seen in FIG. 8, the phase difference varies based on the incident angle of the incoming wave, and is relatively linear for a given angle; for example, an incoming angle of +20 degrees (the square pattern) generally aligns for the unit cell indexes along a 60 degree differential phase value. The phase differences for a row (or column) can be averaged or otherwise combined to map to a more particular angle of arrival estimate, and the phase differences for more than one row or column can be evaluated. Although only five angles of arrival are shown, other angles of arrival can be measured or simulated to obtain phase differential profiles that indicate what the angle of arrival is. Interpolation between the phase differences of two simulated or known for angles of arrival also can be used to estimate phase differences for angles of arrival between those two.

It should be noted that more valuable information can be obtained by using the differential delay values from more unit cells. However, if only a row or column of adjacent cells are used for evaluation, delay detection networks may not be needed for the non-evaluated unit cells. Still further, while the phase differences of adjacent cells were evaluated with respect to FIG. 6, information can be obtained from non-adjacent cells, e.g., phase differences between the first and third unit cells, the third and fifth unit cells and so on can be used to estimate an angle of arrival, although likely somewhat less accurately.

Figure 9:
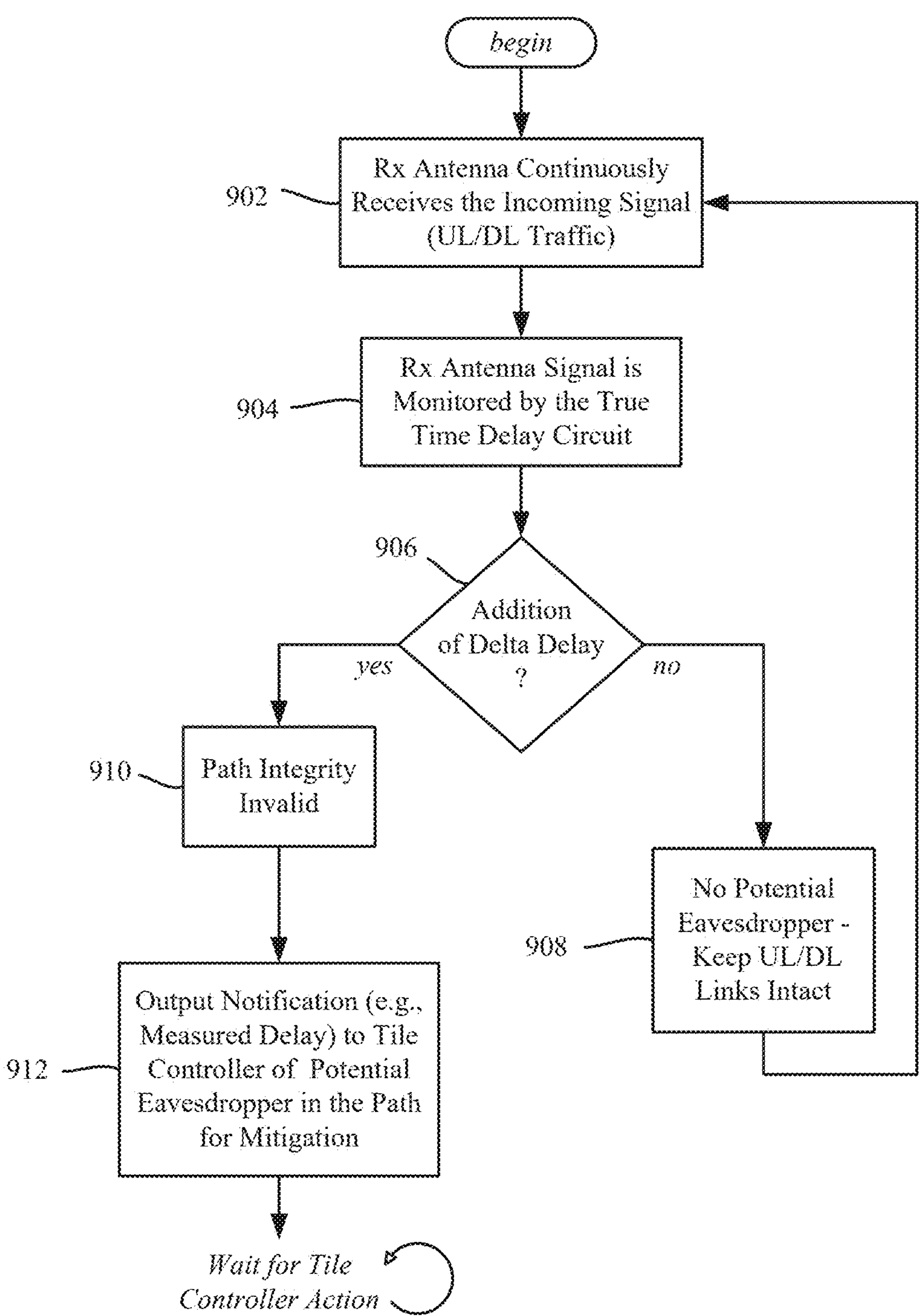
FIG. 9 is a flow diagram showing example operations related to monitoring the receive (Rx) antenna of a reconfigurable intelligent surface to verify path integrity, in accordance with various example embodiments and implementations of the subject disclosure.

FIG. 9 is a flow diagram showing example operations related to monitoring path integrity, beginning at operation 902 which represents the Rx antenna continuously receiving the incoming signals for both uplink and downlink (UL/DL) traffic. Operation 904 represents the incoming signals received via the Rx antenna being monitored by the true time delay circuit.

Operation 906 represents evaluating whether there is additional delta delay detected. If not, operation 906 branches to operation 908 which represents the system recognizing that the path integrity is valid/no potential eavesdropper is present, whereby the uplink and downlink (UL/DL) path links are kept intact and the monitoring continues.

It should be noted that some relatively small delay deviation threshold may be used to allow for some margin of error; for example, weather changes, a brief reflection from a bird, and so on can change the delay/angle of arrival, but not significantly. Note however that a local tile controller can already have current local environmental state data (e.g., rain, humidity, temperature and the like) and thus the threshold/expected angle of arrival can be adjusted based on such current local environmental state data. Indeed, in one implementation, such current local environmental state data can be used as input to a generative adversarial network model that evaluates the path integrity.

If instead at operation 906 additional delta delay is detected, operation 906 branches to operation 910 which represents the system recognizing that the path integrity is invalid/a potential eavesdropper is present, whereby the uplink and downlink (UL/DL) path links are compromised. Operation 912 represents outputting a notification, (e.g., the measured delay value) to the tile controller/base station and so forth for some type of mitigation, e.g., change polarization, add noise, and so on.

Figure 10:
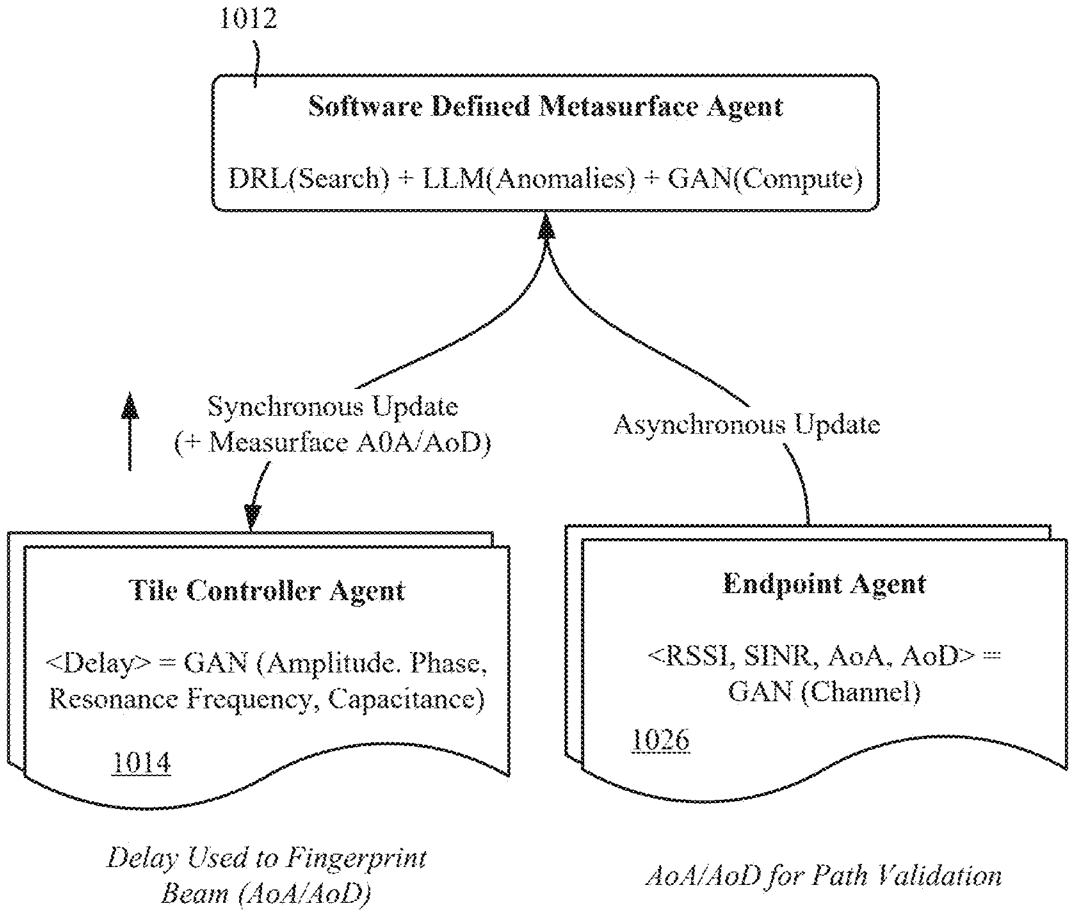
FIG. 10 is a representation of models within network equipment and a user equipment (endpoint agent) that can be used to detect an invalid communications path, in accordance with various example embodiments and implementations of the subject disclosure.

FIG. 10 shows one example implementation of various AI/ML models for inferencing that can be configured and implemented by the various legitimate entities for use in path integrity validation. In general, the tile controller (an agent 1014) runs a generative adversarial network model having a discriminator trained to fingerprint beam data, and in particular, to compute a delay based on amplitude, phase, resonance frequency and capacitance associated with a monitored signal. These delay data are fed via (e.g., synchronous sampling) updates to a software defined metasurface agent 1012, which is configured with multiple models.

An endpoint agent 1026, e.g., running on the user equipment, also runs a generative adversarial network model based on channel characteristics for signals. Note that a generative adversarial network model is similar to traditional compute methods, but is mapped into very small footprint suitable for user equipment resources. In general, the endpoint agent's generative adversarial network model captures a vector <RSSI, SINR, AoA, AoD> (received signal strength information, signal-plus-interference-to-noise-ratio data, angle of arrival data, angle of departure data) from the channel characteristics and sends the information via asynchronous updates to the software defined metasurface agent 1012.

In general, the software defined metasurface agent 1012 runs in a controller on the edge cloud or the like, and is therefore centralized from the perspective of base stations and/or tile controllers, which can have wired connections to the edge cloud. In one example implementation, the software defined metasurface agent 1012 includes a deep information learning (DRL) model for path searching, although in this system the location of the reconfigurable intelligent surface is known. A large language model (LLM) is used for macro level anomaly detection. A generative adversarial network (GAN) uses the delay data and the user equipment-provided vector data to compute and evaluate the angles of arrival with the expected angles of arrival, notifying the tile controller if an anomaly is detected.

Figure 11:
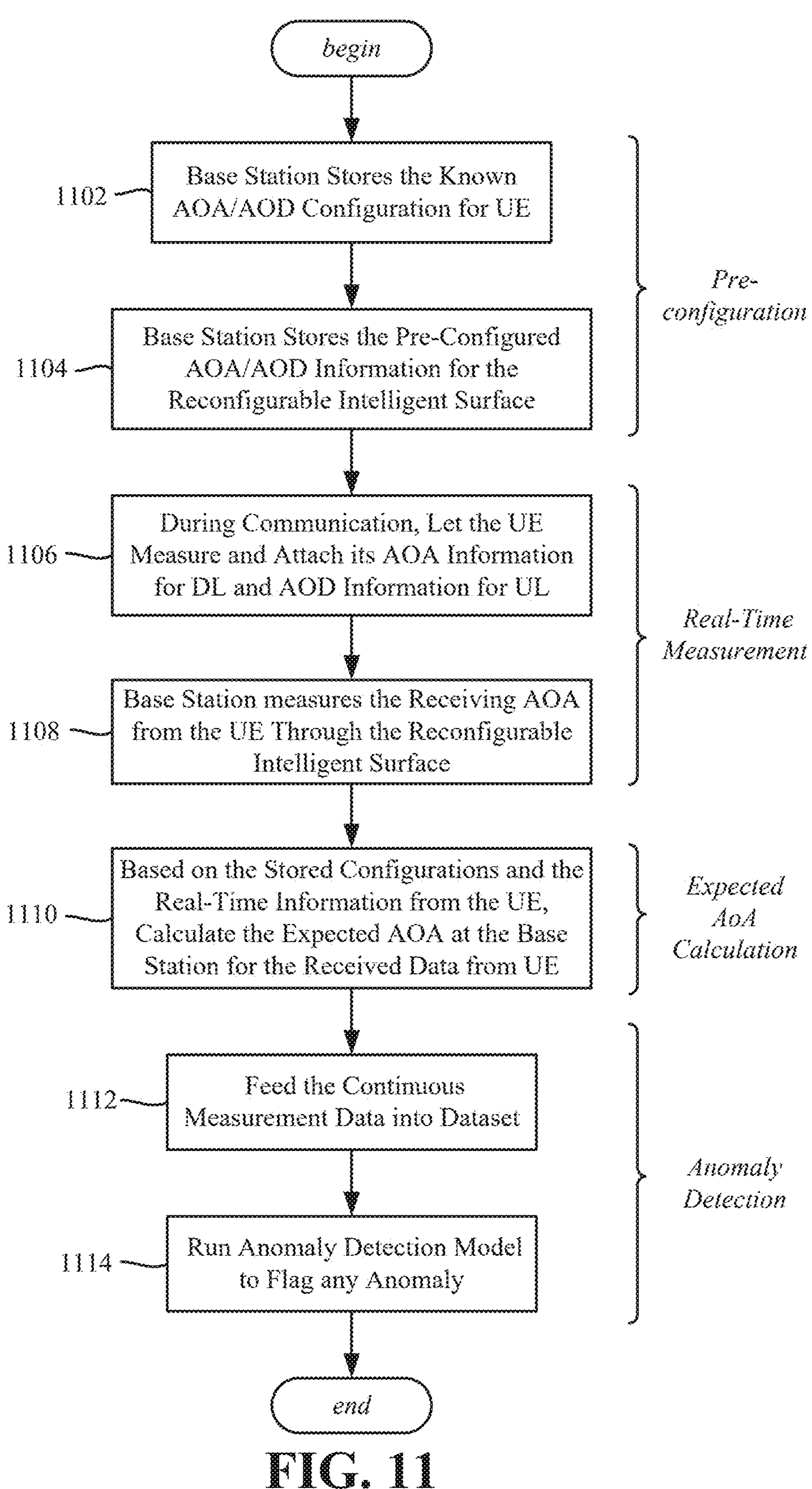
FIG. 11 is a flow diagram showing example operations related to angle of arrival/angle of departure (AoA/AoD) assisted path validation, in accordance with various example embodiments and implementations of the subject disclosure.

FIG. 11 summarizes various operations related to angle of arrival/angle of departure-assisted path validation, beginning with pre-configuration operations 1102 and 1104. Operation 1102 represents the base station storing the known angle of arrival/angle of departure configuration for the user equipment. Operation 1104 represents base station storing the pre-configured angle of arrival/angle of departure information for the reconfigurable intelligent surface.

Operations 1106 and 1108 are directed towards real-time measurement, including operation 1106 which, during communication, lets the user equipment measure and attach its angle of arrival information for downlink signals and angle of departure information for uplink signals. At operation 1108, the base station measures the receiving angle of arrival from the user equipment through the reconfigurable intelligent surface.

Operation 1110 represents the expected angle of arrival determination. More particularly, based on the stored configurations and the real-time information from the user equipment, operation 1110 calculates the expected angle of arrival at the base station for the received data from user equipment.

With respect to anomaly detection, operation 1112 represents feeding the continuous measurement data into a dataset. Based on the dataset, operation 1114 runs the anomaly detection model to flag any anomaly and output a notification if an anomaly is detected.

Figure 12:
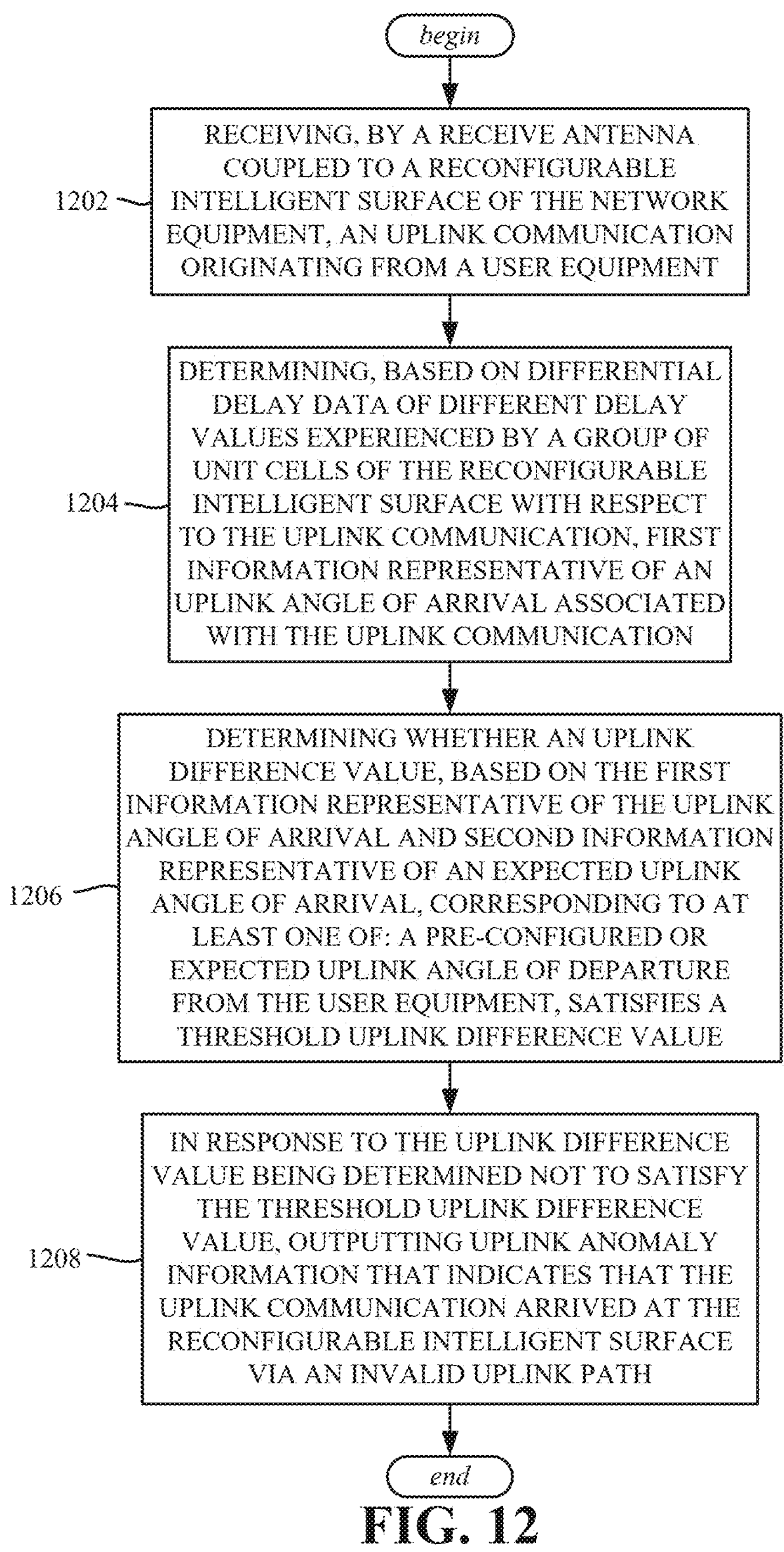
FIG. 12 is a flow diagram showing example operations related to outputting uplink anomaly information that indicates that the uplink communication arrived at the reconfigurable intelligent surface via an invalid uplink path, in response to an uplink difference value being determined not to satisfy a threshold uplink difference value, in accordance with various example embodiments and implementations of the subject disclosure.

One or more concepts described herein can be embodied in network equipment, such as represented in the example operations of FIG. 12, and for example can include at least one memory that stores computer executable components and/or operations, and at least one processor that executes computer executable components and/or operations stored in the memory. Example operations can include operation 1202, which represents receiving, by a receive antenna coupled to a reconfigurable intelligent surface of the network equipment, an uplink communication originating from a user equipment. Example operation 1204 represents determining, based on differential delay data of different delay values experienced by a group of unit cells of the reconfigurable intelligent surface with respect to the uplink communication, first information representative of an uplink angle of arrival associated with the uplink communication. Example operation 1206 represents determining whether an uplink difference value, based on the first information representative of the uplink angle of arrival and second information representative of an expected uplink angle of arrival, corresponding to at least one of: a pre-configured or expected uplink angle of departure from the user equipment, satisfies a threshold uplink difference value. Example operation 1208 represents, in response to the uplink difference value being determined not to satisfy the threshold uplink difference value, outputting uplink anomaly information that indicates that the uplink communication arrived at the reconfigurable intelligent surface via an invalid uplink path.

The first information representative of the uplink angle of arrival can include detected delay data representative of a first delay associated with the uplink angle of arrival, and the second information representative of the expected uplink angle of arrival can include expected delay data representative of a second delay associated with the expected angle of arrival.

Further operations can include determining the detected delay data, which can include inputting parameter data associated with the uplink communication and the group of unit cells to a generative adversarial network model, the parameter data comprising at least one of: amplitude data representative of an amplitude associated with the uplink communication, phase data representative of a phase associated with the uplink communication, resonance frequency data representative of a resonance frequency associated with the uplink communication, or capacitance data representative of a capacitance associated with the uplink communication. The generative adversarial network model can run on a tile controller of the network equipment, and the tile controller can be coupled to the reconfigurable intelligent surface.

Further operations can include obtaining third information representative of downlink angle of arrival data, determined by the user equipment, representative of a downlink angle of arrival for a downlink communication received at the user equipment via the reconfigurable intelligent surface, determining whether a downlink difference value, based on the third information and fourth information representative of expected downlink angle data corresponding to a pre-configured downlink angle of departure from the reconfigurable intelligent surface, satisfies a threshold downlink value, and in response to the downlink angle difference value being determined not to satisfy the threshold downlink angle value, outputting downlink anomaly information that indicates that the downlink communication arrived at the user equipment via an invalid downlink path. Obtaining of the third information can include receiving information representative of a vector dataset from the user equipment determined based on a generative adversarial network associated with the user equipment; the vector dataset can include received signal strength information representative of a received signal strength of the downlink communication, signal-plus-interference-to-noise-ratio data representative of a signal-plus-interference-to-noise-ratio of the downlink communication, the downlink angle of arrival data, and uplink angle of departure data representative of an uplink angle of departure of the uplink communication.

The reconfigurable intelligent surface can include an array of rows and columns of unit cells, and the group of unit cells can include at least part of a row of adjacent unit cells of the array, or at least part of a column of adjacent unit cells of the array.

Further operations can include respective reconfigurable delay detection network equipment coupled to respective cells of the group of the unit cells of the reconfigurable intelligent surface. The respective reconfigurable delay detection network equipment can detect respective changes in capacitance values corresponding to respective delay values of the different delay values experienced by the group of unit cells, and the differential delay data can be based on the respective delay values. The respective changes in capacitance can correspond to respective differential phase values, and the uplink angle of arrival can correspond to respective phase angle data associated with the respective differential phase values.

The network equipment can include a software defined metasurface controller and a tile controller associated with the reconfigurable intelligent surface, and further operations can include, in response to the uplink difference value being determined not to satisfy the uplink threshold value, communicating uplink delay information from the software defined metasurface controller to the tile controller.

The threshold uplink difference value can be set based at least in part on environmental state data representative of an environmental state applicable to the network equipment.

One or more example implementations and embodiments, such as corresponding to example operations of a method, are represented in FIG. 13. Example operation 1302 represents verifying, by network equipment comprising at least one processor, whether a signal path is valid, or is potentially compromised by a device associated with an eavesdropping entity, the verifying can include operations 1304, 1306, 1308, 1310, and 1312. Example operation 1304 represents maintaining first evaluation information representative of expected downlink angle of arrival configuration data associated with a user equipment corresponding to preconfigured downlink angle of departure configuration data associated with a reconfigurable intelligent surface in the signal path between a base station and the user equipment. Example operation 1306 represents maintaining second evaluation information representative of expected uplink angle of departure configuration data associated with a user equipment corresponding to preconfigured uplink angle of arrival configuration data associated with the reconfigurable intelligent surface. Example operation 1308 represents obtaining first measured data representative of received downlink angle of arrival data based on a downlink communication received at the user equipment via the reconfigurable intelligent surface. Example operation 1310 represents obtaining second measured data representative of received uplink angle of arrival data for an uplink communication sent by the user equipment via the reconfigurable intelligent surface. Example operation 1312 represents determining whether an anomaly in the signal path is present based on at least one of the first measured data representative of the downlink angle of arrival data compared to the first evaluation information (example block 1314), or the second measured data representative of the uplink angle of arrival data compared to the second evaluation information (example block 1316).

The second measured data representative of the received uplink angle of arrival data can correspond to a measured uplink delay, and determining whether the anomaly in the signal path is present can include comparing the measured uplink delay with an expected delay corresponding to the second evaluation information.

The first measured data can be maintained in a first vector dataset that can include at least one of: received signal strength information, signal-plus-interference-to-noise-ratio data, or the received downlink angle of arrival data, the second measured data can be maintained in a second vector dataset that can include at least one of: amplitude data, phase data, resonance frequency data, or capacitance data, and determining whether the anomaly in the signal path is present can include inputting the first vector dataset and the second vector dataset into a generative adversarial network that is trained to detect anomalies based on the first vector dataset and the second vector dataset.

Further operations can include, in response to determining that the anomaly in the signal path is present, identifying, by the network equipment, the path as potentially compromised.

Maintaining the first evaluation information, the second evaluation information, and obtaining the second measured data can be performed by the base station.

Figure 14:
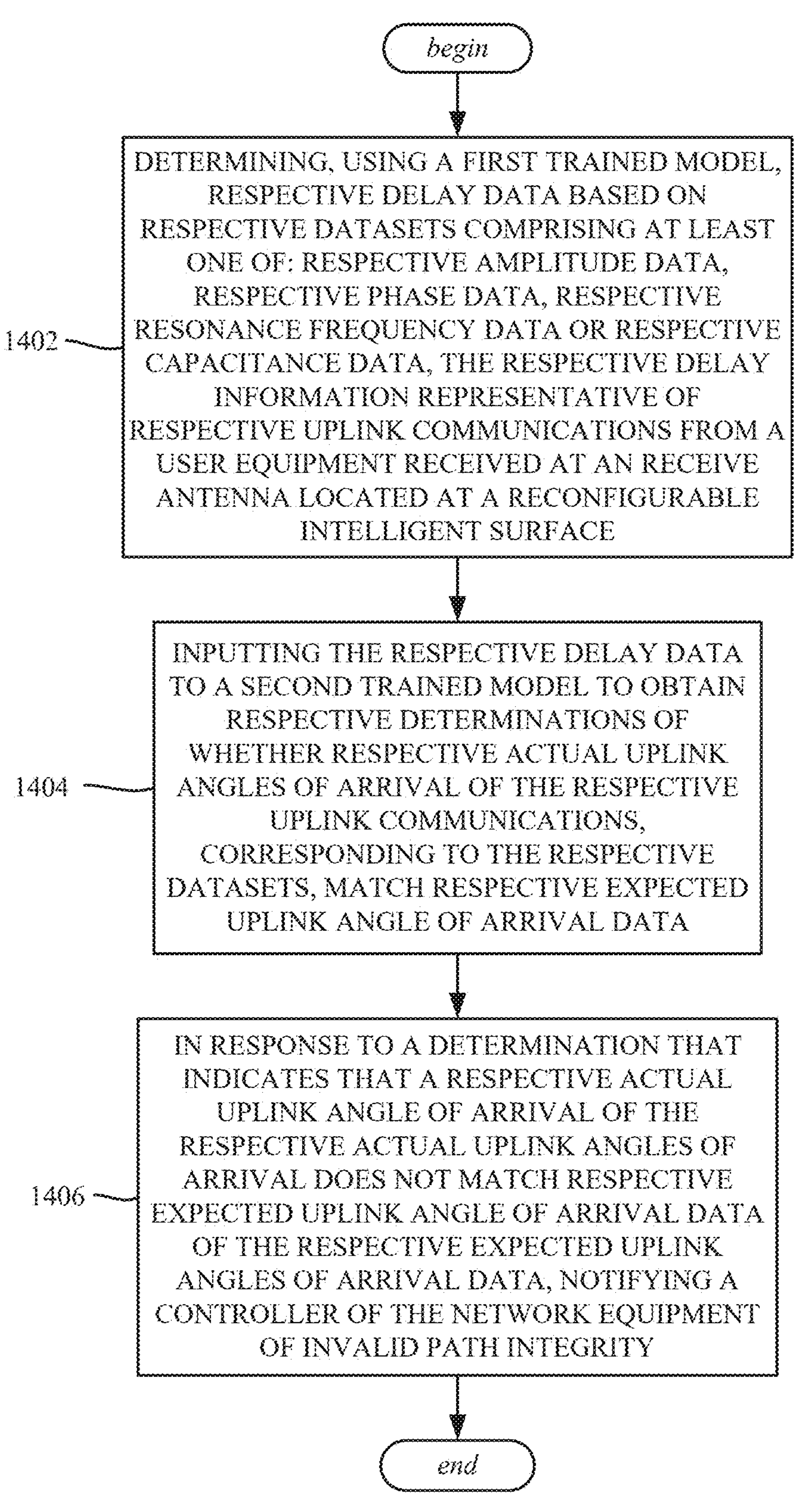
FIG. 14 is a flow diagram showing example operations related to notifying a controller of invalid path integrity in response to a determination that an actual uplink angle of arrival does not match an expected uplink angle of arrival, in accordance with various example embodiments and implementations of the subject disclosure.

FIG. 14 summarizes various example operations, e.g., corresponding to a machine-readable medium, comprising executable instructions that, when executed by at least one processor of network equipment, facilitate performance of operations. Example operation 1402 represents determining, using a first trained model, respective delay data based on respective datasets comprising at least one of: respective amplitude data, respective phase data, respective resonance frequency data or respective capacitance data, the respective delay information representative of respective uplink communications from a user equipment received at an receive antenna located at a reconfigurable intelligent surface. Example operation 1404 represents inputting the respective delay data to a second trained model to obtain respective determinations of whether respective actual uplink angles of arrival of the respective uplink communications, corresponding to the respective datasets, match respective expected uplink angle of arrival data. Example operation 1406 represents in response to a determination that indicates that a respective actual uplink angle of arrival of the respective actual uplink angles of arrival does not match a respective expected uplink angle of arrival of the respective expected uplink angle of arrival data, notifying a controller of the network equipment of invalid path integrity.

The respective datasets can include respective real time data corresponding to the respective uplink communications, and determining the respective delay data can include inputting at least some of the respective datasets into the first trained model.

The respective datasets can include first respective datasets, the respective determinations can include respective first determinations, and further operations can include obtaining, from an endpoint agent of the user equipment, second respective datasets based on at least one of: respective received signal strength information, respective signal-plus-interference-to-noise-ratio data, respective received downlink angle of arrival data, or respective transmitted uplink angle of departure data, inputting at least some of the second respective datasets into the second trained model to obtain respective second determinations of whether respective actual downlink angles of arrival of respective downlink communications, corresponding to the respective second datasets, match respective expected downlink angle of arrival data, and in response to a second determination that indicates that a respective actual downlink angle of arrival of the respective actual downlink angles of arrival does not match respective actual downlink angle of arrival data of the respective actual downlink angles of arrival data, notifying a controller of the network equipment of invalid path integrity.

As can be seen, the technology described herein is directed to full-path validation, including integrating detection circuitry in reconfigurable intelligent surface hardware such that a full-path validation can be made without any significant compute burden. In this way, attackers can be detected when attempting to exploit reconfigurable intelligent surface technology by hijacking and altering communication paths, whereby the technology described herein helps to avoid potential unauthorized access or data interception. Such path manipulation risks emphasize the need for ensuring the integrity of the signal path in reconfigurable intelligent surface-assisted systems.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:

at least one processor; and at least one memory that stores executable instructions that, when executed by the at least one processor, facilitate performance of operations, the operations comprising:

receiving, by a receive antenna coupled to a reconfigurable intelligent surface of the network equipment, an uplink communication originating from a user equipment;

determining, based on differential delay data of different delay values experienced by a group of unit cells of the reconfigurable intelligent surface with respect to the uplink communication, first information representative of an uplink angle of arrival associated with the uplink communication;

determining whether an uplink difference value, based on the first information representative of the uplink angle of arrival and second information representative of an expected uplink angle of arrival, corresponding to at least one of: a pre-configured or expected uplink angle of departure from the user equipment, satisfies a threshold uplink difference value;

in response to the uplink difference value being determined not to satisfy the threshold uplink difference value, outputting uplink anomaly information that indicates that the uplink communication arrived at the reconfigurable intelligent surface via an invalid uplink path;

obtaining third information representative of downlink angle of arrival data, determined by the user equipment, representative of a downlink angle of arrival for a downlink communication received at the user equipment via the reconfigurable intelligent surface;

determining whether a downlink angle difference value, based on the third information and fourth information representative of expected downlink angle data corresponding to a pre-configured downlink angle of departure from the reconfigurable intelligent surface, satisfies a threshold downlink angle value; and in response to the downlink angle difference value being determined not to satisfy the threshold downlink angle value, outputting downlink anomaly information that indicates that the downlink communication arrived at the user equipment via an invalid downlink path, wherein the obtaining of the third information comprises receiving information representative of a vector dataset from the user equipment determined based on a generative adversarial network associated with the user equipment, the vector dataset comprising received signal strength information representative of a received signal strength of the downlink communication, signal-plus-interference-to-noise-ratio data representative of a signal-plus-interference-to-noise-ratio of the downlink communication, the downlink angle of arrival data, and uplink angle of departure data representative of an uplink angle of departure of the uplink communication.

2. The network equipment of claim 1, wherein the first information representative of the uplink angle of arrival comprises detected delay data representative of a first delay associated with the uplink angle of arrival, and wherein the second information representative of the expected uplink angle of arrival comprises expected delay data representative of a second delay associated with the expected uplink angle of arrival.

3. The network equipment of claim 2, wherein the operations further comprise determining the detected delay data, comprising inputting parameter data associated with the uplink communication and the group of the unit cells to a generative adversarial network model, the parameter data comprising at least one of: amplitude data representative of an amplitude associated with the uplink communication, phase data representative of a phase associated with the uplink communication, resonance frequency data representative of a resonance frequency associated with the uplink communication, or capacitance data representative of a capacitance associated with the uplink communication.

4. The network equipment of claim 3, wherein the generative adversarial network model runs on a tile controller of the network equipment, the tile controller coupled to the reconfigurable intelligent surface.

5. The network equipment of claim 1, wherein the reconfigurable intelligent surface comprises an array of rows and columns of unit cells, and wherein the group of the unit cells comprises at least part of a row of adjacent unit cells of the array, or at least part of a column of adjacent unit cells of the array.

6. The network equipment of claim 1, further comprising:

respective reconfigurable delay detection network equipment coupled to respective cells of the group of the unit cells of the reconfigurable intelligent surface.

7. The network equipment of claim 6, wherein the respective reconfigurable delay detection network equipment detects respective changes in capacitance values corresponding to respective delay values of the different delay values experienced by the group of the unit cells, and wherein the differential delay data is based on the respective delay values.

8. The network equipment of claim 7, wherein the respective changes in capacitance correspond to respective differential phase values, and wherein the uplink angle of arrival corresponds to respective phase angle data associated with the respective differential phase values.

9. The network equipment of claim 1, wherein the network equipment comprises a software defined metasurface controller and a tile controller associated with the reconfigurable intelligent surface, and wherein the operations further comprise, in response to the uplink difference value being determined not to satisfy the threshold uplink difference value, communicating uplink delay information from the software defined metasurface controller to the tile controller.

10. The network equipment of claim 1, wherein the threshold uplink difference value is set based at least in part on environmental state data representative of an environmental state applicable to the network equipment.

11. A non-transitory machine-readable medium, comprising executable instructions that, when executed by at least one processor, facilitate performance of operations, comprising:

receiving, via a receive antenna connected to a reconfigurable intelligent surface, an uplink communication originating from a user device;

determining, based on differential delay data of different delay values experienced by a group of unit cells of the reconfigurable intelligent surface with respect to the uplink communication, first information representative of an uplink angle of arrival associated with the uplink communication;

determining whether an uplink difference value, based on the first information representative of the uplink angle of arrival and second information representative of an expected uplink angle of arrival, corresponding to at least one of: a pre-configured or expected uplink angle of departure from the user device, satisfies a threshold uplink difference value;

in response to the uplink difference value being determined not to satisfy the threshold uplink difference value, outputting uplink anomaly information that indicates that the uplink communication arrived at the reconfigurable intelligent surface via an invalid uplink path; and detecting, via respective reconfigurable delay detection network equipment coupled to respective cells of the group of the unit cells of the reconfigurable intelligent surface, respective changes in capacitance values corresponding to respective delay values of the different delay values experienced by the group of the unit cells, wherein the differential delay data is based on the respective delay values.

12. The non-transitory machine-readable medium of claim 11, wherein the operations further comprise:

obtaining third information representative of downlink angle of arrival data, determined by the user device, representative of a downlink angle of arrival for a downlink communication received at the user device via the reconfigurable intelligent surface, determining whether a downlink angle difference value, based on the third information and fourth information representative of expected downlink angle data corresponding to a pre-configured downlink angle of departure from the reconfigurable intelligent surface, satisfies a threshold downlink angle value, and in response to the downlink angle difference value being determined not to satisfy the threshold downlink angle value, outputting downlink anomaly information that indicates that the downlink communication arrived at the user device via an invalid downlink path.

13. The non-transitory machine-readable medium of claim 12, wherein the obtaining of the third information comprises receiving information representative of a vector dataset from the user device determined based on a generative adversarial network associated with the user device, the vector dataset comprising received signal strength information representative of a received signal strength of the downlink communication, signal-plus-interference-to-noise-ratio data representative of a signal-plus-interference-to-noise-ratio of the downlink communication, the downlink angle of arrival data, and uplink angle of departure data representative of an uplink angle of departure of the uplink communication.

14. The non-transitory machine-readable medium of claim 11, wherein the first information representative of the uplink angle of arrival comprises detected delay data representative of a first delay associated with the uplink angle of arrival, and wherein the second information representative of the expected uplink angle of arrival comprises expected delay data representative of a second delay associated with the expected uplink angle of arrival.

15. The non-transitory machine-readable medium of claim 14, wherein the operations further comprise determining the detected delay data, comprising inputting parameter data associated with the uplink communication and the group of the unit cells to a generative adversarial network model, the parameter data comprising at least one of: amplitude data representative of an amplitude associated with the uplink communication, phase data representative of a phase associated with the uplink communication, resonance frequency data representative of a resonance frequency associated with the uplink communication, or capacitance data representative of a capacitance associated with the uplink communication.

16. The non-transitory machine-readable medium of claim 15, wherein the generative adversarial network model runs on a tile controller, and wherein the tile controller is coupled to the reconfigurable intelligent surface.

17. A method, comprising:

receiving, by network equipment comprising at least one processor, via a receive antenna coupled to a reconfigurable intelligent surface of the network equipment, an uplink communication originating from a user equipment;

determining, by the network equipment based on differential delay data of different delay values experienced by a group of unit cells of the reconfigurable intelligent surface with respect to the uplink communication, first information representative of an uplink angle of arrival associated with the uplink communication;

determining, by the network equipment, whether an uplink difference value, based on the first information representative of the uplink angle of arrival and second information representative of an expected uplink angle of arrival, corresponding to at least one of: a preconfigured or expected uplink angle of departure from the user equipment, satisfies a threshold uplink difference value; and in response to the uplink difference value being determined not to satisfy the threshold uplink difference value, outputting, by the network equipment, uplink anomaly information that indicates that the uplink communication arrived at the reconfigurable intelligent surface via an invalid uplink path, wherein the network equipment comprises a software defined metasurface controller and a tile controller associated with the reconfigurable intelligent surface, and wherein the method further comprises:

in response to the uplink difference value being determined not to satisfy the threshold uplink difference value, communicating, by the network equipment, uplink delay information from the software defined metasurface controller to the tile controller.

18. The method of claim 17, wherein the reconfigurable intelligent surface comprises an array of rows and columns of unit cells, and wherein the group of the unit cells comprises at least part of a row of adjacent unit cells of the array, or at least part of a column of adjacent unit cells of the array.

19. The method of claim 17, wherein the first information representative of the uplink angle of arrival comprises detected delay data representative of a first delay associated with the uplink angle of arrival, and wherein the second information representative of the expected uplink angle of arrival comprises expected delay data representative of a second delay associated with the expected uplink angle of arrival.

20. The method of claim 19, further comprising:

determining, by the network equipment, the detected delay data, comprising inputting parameter data associated with the uplink communication and the group of the unit cells to a generative adversarial network model, the parameter data comprising at least one of: amplitude data representative of an amplitude associated with the uplink communication, phase data representative of a phase associated with the uplink communication, resonance frequency data representative of a resonance frequency associated with the uplink communication, or capacitance data representative of a capacitance associated with the uplink communication.

* * * * *